A. E. BURRUSS.
POTATO DIGGING MACHINE.
APPLICATION FILED JULY 3, 1918.
1,281,509.
Patented Oct. 15, 1918.
2 SHEETS—SHEET 2.
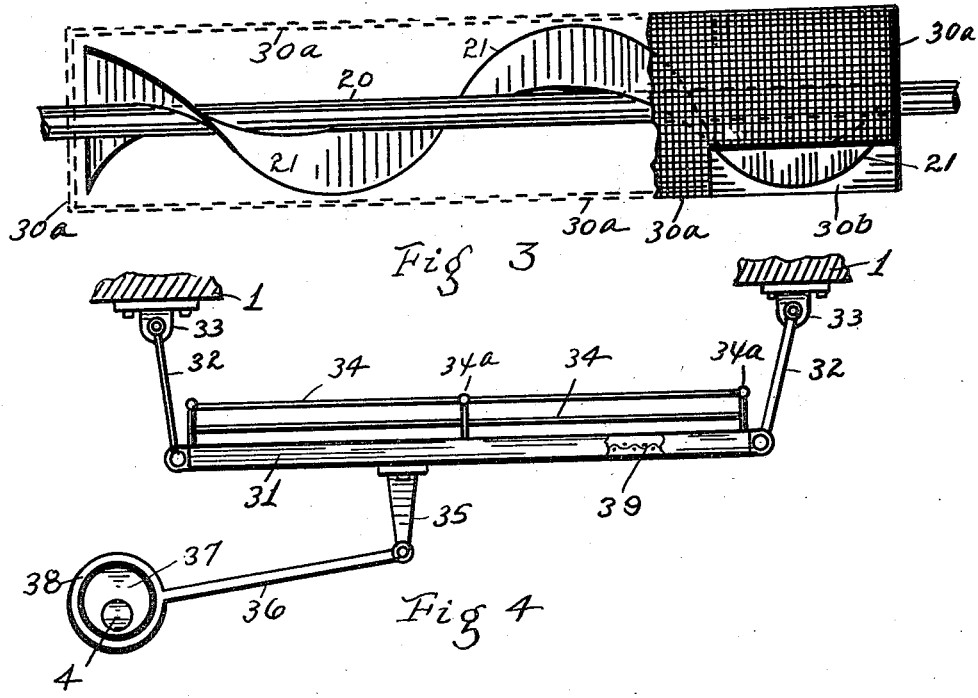
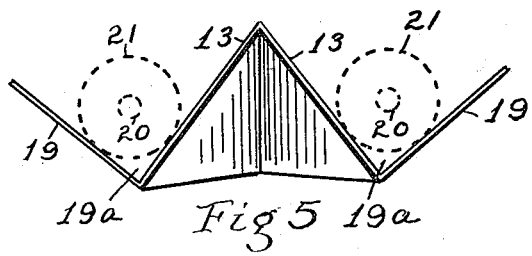
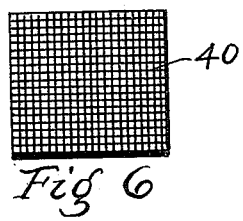
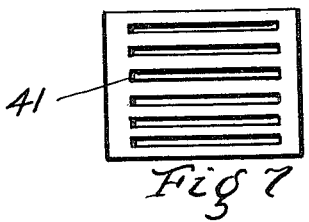
Albert E. Burruss, Inventor

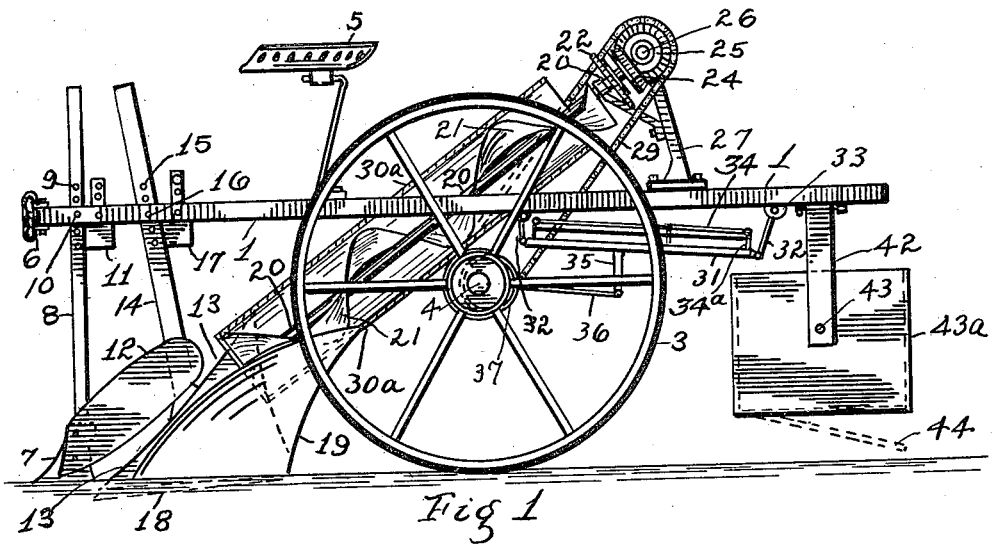
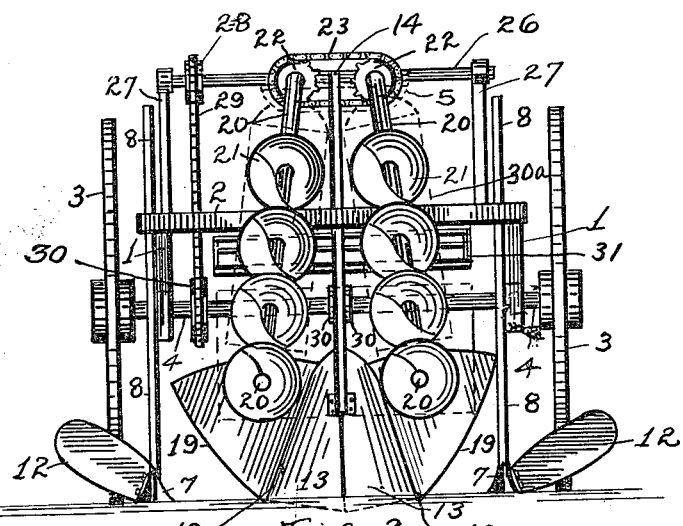

UNITED STATES PATENT OFFICE.

ALBERT E. BURRUSS, OF NORFOLK, VIRGINIA.

POTATO-DIGGING MACHINE.

1,281,509.　　　Specification of Letters Patent.　　Patented Oct. 15, 1918.

Application filed July 3, 1918.　Serial No. 243,200.

*To all whom it may concern:*

Be it known that I, ALBERT E. BURRUSS, a citizen of the United States, residing at Norfolk, in the county of Norfolk and State of Virginia, have invented certain new and useful Improvements in Potato-Digging Machines, of which the following is a specification.

My invention relates to potato digging machines and the like.

The object of the invention is to provide a rapid and efficient potato digger which will separate the potatoes from adhering dirt or soil and deliver the same to a suitable receptacle therefor.

Further objects and advantages will be more fully described herein and specifically pointed out in the annexed claims recourse being had to the accompanying drawings forming a part of this specification in which:

Figure 1 is a side view of the potato digging machine.

Fig. 2 is a front view of the same.

Fig. 3 is a part elevation of the spiral conveyer inclosing cage and the spiral conveyers operating therein.

Fig. 4 is a side elevation of the reciprocating sifter and its operating devices.

Fig. 5 is an under plan view of the digger plow and its wing plates.

Fig. 6 is a plan of a woven wire fabric or netting for the conveyer cages and sifter, and Fig. 7 is a plan of a perforated metal plate or plates which may be used in place of the wire netting or cloth shown in Fig. 6.

In the drawings like reference numerals indicate similar parts in all the several views.

1 are the longitudinal and 2 are the transverse frame members suitably mounted on the axle 4 of the wheels 3, in the ordinary manner.

5 is a seat for the driver and 6 is a clevis for the attachment of suitable gear for one or two horses for drawing the machine similar to the operation of plowing.

For cutting down the potato or other vines, in advance of the digging plow, I provide a V shaped point or points 7 mounted at the lower ends of the bars 8 which are provided with holes 9 for vertical adjustment, said adjustment being maintained by pins 10 passing through a part of the frame members 1.

In this manner the vine cutters may be raised or lowered and held in either position, as shown.

11 is an adjustable stop block for taking the thrust of the rods 8 when the apparatus moves forward.

12 are wing plates attached to the vine cutters 7 and disposed at an angle, their object being to throw the cut vines to each side thereof and out of the way of the wheels 3.

13 is the potato digging plow adapted to be placed in the center of the row and to enter the soil at any depth sufficient to lift the potatoes therefrom.

The digger plow is supported by the bar 14 provided with holes 15 at its upper end and adapted to come in line with an orifice in the frame members 1 and held thereto by a pin 16 at any angle suitable for any depth of penetration.

17 is a stop block for taking the pressure of the digger plow 13 in the same manner as that at 11 shown in connection with the vine cutter bars 8.

18, shown by dotted lines in Fig. 1, indicates the depth of the plow which may be more or less, as required.

19 are wing plates secured to the digger plow 13, the latter having the shape of an inverted V, while the former are disposed at such an angle as to resemble the letter W, consequently, the hollows or valleys 19$^a$, (Fig. 5), are formed in which the sheet metal spiral conveyers 21 operate and are rotated by means of the shafts 20.

The spirals are formed by spirally winding a narrow sheet of metal around the shafts 20 and are secured thereto in a suitable manner, as shown in Fig. 3 upon an enlarged scale.

As there are two conveyer shafts they are connected together by means of the sprocket wheels 22 and chain 23 so that one drives the other, therefore, the driver shaft is provided with a bevel gear wheel 24 driven by a similar gear wheel 25 meshing therewith and located upon the transverse shaft 26 and supported by the brackets 27.

The cross or transverse shaft also carries a sprocket wheel 28 connected by means of a sprocket chain 29 to the driving sprocket wheel 30 on the wheel axle 4.

The spiral conveyers 21 are surrounded by cylindrical wire cloth or perforated metal cage 30$^a$ provided with an outlet 30$^b$ for the potatoes as shown in Fig. 3 at the upper end of the cages. When the digger plow 13 lifts the potatoes, some of the soil is carried into the cage by the spiral conveyers but as it rotates most of the dirt is removed by falling through the meshes or perforations of the cages and falls on the ground.

Any dirt that shall be raised to the top ends of the cages will be removed by the hereinafter described sifter.

Referring to Fig. 5, it will be seen that the digging plow 13 will cause the potatoes and some of the soil to be crowded into the spaces 19$^a$ between the plow and the side wing plates 19 and as the conveyers 21 are placed in this concavity or hollow, they will remove the potatoes as fast as they are dug.

31 is a shaking sifter placed under the outlets of the conveyers either if the cages 30$^a$ be open ended at the top, as in Fig. 1, or having a bottom outlet 30$^b$, as in Fig. 3.

The sifter is swung upon links 32 having their upper ends loosely mounted in the bearings 33 upon the longitudinal frame members 1.

34 indicates railings placed around three sides of the sifter and supported by posts 34$^a$ and are for the purpose of allowing any dirt to fall off but yet to retain the potatoes and permit their being discharged into a suitable receptacle at the open end of the rails 34.

The sifter is given a reciprocating or shaking motion from the main wheel shaft 4, 35 being a shaker lug attached to the bottom of the sifter having an eccentric rod 36 attached to its lower portion, said rod having the strap 38 formed therewith and adapted to be mounted upon the periphery of the eccentric cam 37 getting its motion from the axle 4, as shown in Figs. 1 and 4.

39, Fig. 4, represents the sifter wire fabric which may be wire cloth of large mesh as shown in Fig. 6 or perforated metal plate as in Fig. 7.

Referring to Fig. 1, the sifter 31 is so inclined as to allow the potatoes to roll off, at the open end thereof, into the box or receptacle 43$^a$ depending from the longitudinal frame members 1 by means of the supports 42 and held thereto by the pins 43. 44 is a hinged dumping bottom for the box to allow the potatoes to be deposited upon the ground in piles to be subsequently removed.

As the invention is plainly shown in the drawings no further description is considered necessary.

I claim:

1. A potato digging machine comprising an adjustable digging plow, angular side wings thereon forming hollows therebetween and the plow and a rotary spiral conveyer located in said hollows adapted to convey the potatoes to the rear of the machine.

2. A potato digging machine comprising a plow for lifting the potatoes from the soil, angularly disposed wing plates thereon and adapted to form hollows with the plow, a rotary spiral conveyer in said cavities to discharge the potatoes to the rear of the machine, and a perforated sifting cylinder inclosing said spiral conveyer.

3. A potato digging machine provided with an adjustable digger plow, wing plates thereon having a W shape with said plow, a spiral potato conveyer located in the hollows formed by said plow and its wing plates, a sifting cylindrical cage inclosing said conveyer, and a shaking and discharging sifter located at the upper ends of said spiral conveyers.

4. A potato digging machine having a digging plow, side wing plates thereon, a spiral conveyer adapted to receive and discharge potatoes, a cylindrical perforated cage inclosing said conveyers, and a shaking sifter at the discharge ends of said conveyers provided with rails, and a dumping box for receiving the potatoes from said sifter.

In testimony whereof I have hereunto affixed my signature in the presence of two witnesses.

ALBERT E. BURRUSS.

Witnesses:
HYMAN ISAACS,
WILLIAM B. WATSON.

Copies of this patent may be obtained for five cents each, by addressing the "Commissioner of Patents, Washington, D. C."